(12) United States Patent
Shirani et al.

(10) Patent No.: US 9,294,711 B2
(45) Date of Patent: Mar. 22, 2016

(54) DE-INTERLACING AND FRAME RATE UPCONVERSION FOR HIGH DEFINITION VIDEO

(71) Applicant: McMaster University, Hamilton (CA)

(72) Inventors: Shahram Shirani, Oakville (CA); Roozbeh Dehghannasiri, Hamilton (CA)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 14/122,229

(22) PCT Filed: Mar. 15, 2013

(86) PCT No.: PCT/CA2013/050205
§ 371 (c)(1),
(2) Date: Nov. 25, 2013

(87) PCT Pub. No.: WO2013/163751
PCT Pub. Date: Nov. 7, 2013

(65) Prior Publication Data
US 2015/0085188 A1    Mar. 26, 2015

Related U.S. Application Data

(60) Provisional application No. 61/640,319, filed on Apr. 30, 2012.

(51) Int. Cl.
*H04N 7/01*    (2006.01)

(52) U.S. Cl.
CPC . *H04N 7/01* (2013.01); *H04N 7/012* (2013.01)

(58) Field of Classification Search
CPC ..... H04N 7/0112; H04N 7/014; H04N 7/012; H04N 7/01
USPC .................................................. 348/441–459
See application file for complete search history.

(56) References Cited

U.S. PATENT DOCUMENTS

| | | |
|---|---|---|
| 2004/0264576 A1 | 12/2004 | Woods et al. |
| 2008/0074538 A1 | 3/2008 | Chang |
| 2008/0279278 A1 | 11/2008 | Chang |
| 2009/0110285 A1 | 4/2009 | Elad et al. |
| 2010/0002770 A1* | 1/2010 | Motta et al. ............... 375/240.16 |
| 2010/0060798 A1* | 3/2010 | Sato et al. ..................... 348/699 |
| 2010/0188570 A1 | 7/2010 | Gong et al. |

OTHER PUBLICATIONS

Wang, J., et al, Deinterlacing algorithm with an advanced non-local means filter, Optical Engineering, vol. 51, Issue No. 4, pp. 1-10, Apr. 2012, retrieved online via http://opticalengineering.spiedigitallibrary.org on Sep. 18, 2012.

Chen, M., et al, Efficient de-interlacing technique by inter-field information, IEEE Transactions on Consumer Electronics, vol. 50, Issue No. 4, pp. 1202-1208, Nov. 2004.

Zhao, M., Video enhancement using content-adaptive least mean square filters, Thesis, Advanced School for Computing and Imaging (ASCI) graduate school, ASCI dissertation series No. 126, Technische Universiteit Eindhoven, 2006.

(Continued)

*Primary Examiner* — Michael Lee

(57) ABSTRACT

Technologies and implementations for de-interlacing an interlaced digital video and up-converting a frame rate of a digital video are generally disclosed.

28 Claims, 8 Drawing Sheets

(56) References Cited

OTHER PUBLICATIONS

Lee, S., et al, Weighted-adaptive motion-compensated frame rate up-conversion, IEEE Transactions on Consumer Electronics, vol. 49, No. 3, pp. 485-492, Aug. 2003.
Kumar, P., et al, Foreground background segmentation using temporal and spatial markov processes, Dept. of Electrical and Computer Engineering, National University of Singapore, pp. 1-30, Nov. 6, 2000.
Li, X., Video processing via implicit and mixture motion models, IEEE Transactions on Circuits and Systems for Video Technology, vol. 17, Issue No. 8, pp. 953-963, Aug. 2007.
De Haan, G., et al, Deinterlacing-an overview, Proceedings of the IEEE, vol. 86, No. 9, pp. 1839-1857, Sep. 1998, accessed online at citeseerx.ist.psu/viewdoc/download on Sep. 9, 2013.
Park, M.K., et al, New edge dependent deinterlacing algorithm based on horizontal edge pattern, IEEE Transactions on Consumer Electronics, vol. 49, Issue No. 4, pp. 1508-1512, Nov. 2003.
Kwon, O., et al, Deinterlacing using directional interpolation and motion compensation, IEEE Transactions on Consumer Electronics, vol. 49, Issue No. 1, pp. 198-203, Feb. 2003.
Yang, S., et al, Motion compensation assisted motion adaptive interlaced-to progressive converstion, IEEE Transactions on Circuits and Systems for Video Technology, vol. 14, Issue No. 9, pp. 1138-1148, Sep. 2004.
Chang, Y.L., et al, Video deinterlacing by adaptive 4-field global/local motion compensated approach, IEEE Transactions on Circuits and Systems for Video Technology, vol. 15, Issue No. 12, pp. 1569-1582, Dec. 2005.
Jeon B.W., et al, Coarse-to-fine frame interpolation for frame rate up-conversion using pyramid structure, IEEE Transactions on Consumer Electronics, vol. 49, Issue No. 3, pp. 499-508, Aug. 2003, accessed online via dasan.sejong.ac.kr/dihan/dip/8_Pyrannid_FRUC on Sep. 9, 2013.
Choi, B.D., et al, Motion compensated frame interpolation using bilateral motion estimation and adaptive overlapped block motion compensation, IEEE Transactions on Circuits and Systems for Video Technology, vol. 17, Issue No. 4, pp. 407-416, Apr. 2007.
Dehghannasiri, R., et al, A novel de-interlacing method based on locally-adaptive nonlocal-means, Department of Electrical and Computer Engineering, McMaster University, pp. 1708-1712, Asilomar 2012.
Canadian Intellectual Property Office, International Search Report and Written Opinion of the International Searching Authority for PCT/CA2013/050205 mailed on Jul. 11, 2013, Canada.
Dehghannasiri, R., et al, Inspiring innovation and discovery, pp. 1-2, source: http//grads.ece.mcmaster.ca/dehghr/Publications.htm.
Jang, S. M. et al, Deinterlacing method based on edge direction refinement using weighted median filter, in Proceedings of the IEEE International Conference on Signal and Image Processing Applications (ICSIPA), 2009, pp. 227-230.
Yoo, H. et al, Direction-oriented interpolation and its application to de-interlacing, IEEE Transactions on Consumer Electronics, vol. 48, No. 4, pp. 954-962, Nov. 2002.
Li, X. et al, New edge-directed interpolation, IEEE Transactions on Image Processing, vol. 10, No. 10, pp. 1521-1527, Oct. 2001.
Kuo, C. J. et al, Adaptive interpolation technique for scanning rate conversion, IEEE Transactions on Circuits and Systems for Video Technology, vol. 6, No. 3, pp. 317-321, Jun. 1996.
Liang, J. et al, An adaptive de-interlacing algorithm based on motion morphologic detection, in Proceedings of IEEE International Conference on Digital Content, Multimedia Technology and its Applications, 2010, pp. 157-160.
Lee, G. G. et al, A motion-adaptive deinterlacer via hybrid motion detection and edge-pattern recognition, Hindawi Publishing Corporation, EURASIP Journal on Image and Video Processing, vol. 2008, Article ID 741290, pp. 10 pages, Mar. 2008.
Shen, Y. et al, Motion adaptive deinterlacing of video data with texture detection, IEEE Transactions on Consumer Electronics, vol. 52, No. 4, pp. 1403-1408, Nov. 2006.
Kwon, S. et al, A motion-adaptive de-interlacing method, IEEE Transactions on Consumer Electronics, vol. 38, No. 3, pp. 145-150, Aug. 1992.
Yu, L. et al, Motion adaptive deinterlacing with accurate motion detection and anti-aliasing interpolation filter, IEEE Transactions on Consumer Electronics, vol. 52, No. 2, pp. 712-717, May 2006.
Lin, S. F. et al, Motion adaptive interpolation with horizontal motion detection for deinterlacing, IEEE Transactions on Consumer Electronics, vol. 49, No. 4, pp. 1256-1265, Nov. 2003.
Trocan, M. et al, Smooth motion-compensated video deinterlacing, in Proceedings of IEEE 7th International Symposium on Image and Signal Processing and Analysis (ISPA), pp. 143-148, Sep. 4-6, 2011, Dubrovnik, Croatia.
Sun, H. et al, Motion compensation aided motion adaptive de-interlacing for real-time video processing applications, in proceedings of IEEE Asilomar Conference on Signals, Systems and Computers, 2008, pp. 1523-1527.
Wang, D. et al, Hybrid de-interlacing algorithm based on motion vector reliability, IEEE Transactions on Circuits Systems for Video Technology, vol. 15, No. 8, pp. 1019-1025, Aug. 2005.
Jung, Y.Y. et al, An effective de-interlacing technique using two types of motion information, IEEE Transactions on Consumer Electronics, vol. 49, No. 3, pp. 493-498, Aug. 2003.
Ha, T. et al, Motion compensated frame interpolation by new block-based motion estimation algorithm, IEEE Transactions on Consumer Electronics, vol. 50, No. 2, pp. 752-759, May 2004.
Plaziac, N. Image interpolation using neural networks, IEEE Transactions on Image Processing, vol. 8, No. 11, pp. 1647-1651, Nov. 1999.
Woo, D. H. et al, Deinterlacing based on modularization by local frequency characteristics, Optical Engineering, vol. 45, pp. 027004, Feb. 2006.
Choi, H. et al, Neural network deinterlacing using multiple fields and field-MSEs, in Proceedings of International Joint Conference on Neural Networks, (IJCNN), pp. 869-872, Aug. 12-17, 2007, Orlando, Florida, USA.
Buades, A. et al, A non-local algorithm for image denoising, in Computer Vision and Pattern Recognition, IEEE Computer Society Conference on Computer Vision and Pattern Recognition, vol. 2, pp. 60-65, Jun. 20-25, 2005.
Buades, A. et al, A review of image denoising algorithms, with a new one, SIAM Journal on Multiscale Modeling and Simulation, vol. 4, pp. 490-530, 2005.
Protter, M. et al, Generalizing the nonlocal-means to super-resolution reconstruction, IEEE Transactions on Image Processing, vol. 18, No. 1, pp. 36-51, Jan. 2009.
Takeda, H. et al, Kernel regression for image processing and reconstruction, IEEE Transactions on Image Processing, vol. 16, No. 2, pp. 349-366, Feb. 2007.
Wang, Z. et al, Image quality assessment: From error visibility to structural similarity, IEEE Transactions on Image Processing, vol. 13, No. 4, pp. 1-14, Apr. 2004.
Huang, Q. et al, Deinterlacing using hierarchical motion analysis, IEEE Transactions on Circuits and Systems for Video Technololgy, vol. 20, No. 5, pp. 673-686, May 2010.
Choi, H. et al, Motion adaptive deinterlacing with modular neural networks, IEEE Transactions on Circuits and Systems for Video Technology, vol. 21, No. 6, pp. 844-849, Jun. 2011.
Tomasi, C. et al, Bilateral filtering for gray and color images, in Proceedings of the 1998 IEEE International Conference on Computer Vision, pp. 839-846, Bombay, India, 1998.
Park, M.K. et al, Edge-dependent interpolation-based deinterlacing using edge patterns, SPIE Journal of Electronic Imaging, vol. 15, No. 4, pp. 43003-1-043003-8, Oct. 2006, downloaded from http://electronicimaging.spiedigitallibrary.org/ on Nov. 20, 2013.
"YUV Video Sequences," Arizona State University, available at http://trace.eas.asu.edu/yuv/, accessed on Mar. 23, 2015, 6 pages.
Chen, Y. K., et al., "Frame-rate up-conversion using transmitted true motion vectors," IEEE Second Workshop on Multimedia Signal Processing, vol. 2, pp. 622-627 (Dec. 7-9, 1998).
Dane, G., and Nguyen, T. Q., "Optimal temporal interpolation filter for motion-compensated frame rate up conversion," IEEE Transactions on Image Processing, vol. 15, Issue 4, pp. 978-991 (Apr. 2006).

(56) References Cited

OTHER PUBLICATIONS

Huang, A. M., and Nguyen, T. Q., "A Multistage Motion Vector Processing Method for Motion-Compensated Frame Interpolation," IEEE Transactions on Image Processing, vol. 17, Issue 5, pp. 694-708 (May 5, 2008).

Kang, S. J., et al., "Dual Motion Estimation for Frame Rate Up-Conversion," IEEE Transactions on Circuits and Systems for Video Technology, vol. 20, Issue 12, pp. 1909-1914 (Dec. 2010).

Lee, Y. L., and Nguyen, T. "Method and architecture design for motion compensated frame interpolation in high-definition video processing," IEEE International Symposium on Circuits and Systems, ISCAS, pp. 1633-1636 (May 24-27, 2009).

Ling, Y., et al., "A novel spatial and temporal correlation integrated based motion-compensated interpolation for frame rate up-conversion," IEEE Transactions on Consumer Electronics, vol. 54, Issue 2, pp. 863-869 (Jul. 15, 2008).

Zivkovic, Z., "Improved adaptive Gaussian mixture model for background subtraction," Proceedings of the 17th International Conference on Pattern Recognition, ICPR, vol. 2, pp. 28-31 (Aug. 23-26, 2004).

\* cited by examiner

700 A computer program product

702 A signal bearing medium 704
    machine-readable instructions, which, when executed by one or more processors, operatively enable a de-interlacing tool and/or a FRUC tool to:

estimate a first progressive scan video frame based at least in part upon an interlaced video frame from an interlaced video;
    generate a second progressive scan video frame based at least in part upon applying a nonlocal means filter to the estimated first progressive scan video frame;
    insert, by a computing device, an interpolated video frame between a first video frame and a second video frame of the video;
    determine, for each pixel in the interpolated video frame, whether the pixel is a background pixel based at least in part upon the pixels in the first video frame and the pixels in the second video frame;
    set, in response to determination that a pixel in the interpolated video frame is a background pixel, the value of the pixel in the interpolated video frame based at least in part upon the value of the corresponding pixel in the first video frame and the value of the corresponding pixel in the second video frame; or
    set, in response to determination that a pixel in the interpolated video frame is not a background pixel, the value of the pixel in the interpolated video frame based at least in part upon applying a nonlocal means filter to the first video frame and the second video frame.

| 706 a computer-readable medium | 708 a recordable medium | 710 a communications medium |

FIG. 7

DE-INTERLACING AND FRAME RATE UPCONVERSION FOR HIGH DEFINITION VIDEO

CROSS-REFERENCE TO RELATED APPLICATION(S)

This application is a national stage entry under 35 U.S.C. §371 of International Application No. PCT/CA2013/050205, filed on Mar. 15, 2013 which claims priority under 35 U.S.C. §119(e) to U.S. Provisional Application No. 61/640,319 filed on Apr. 30, 2012, the contents of which are incorporated herein by reference.

BACKGROUND

Unless otherwise indicated herein, the approaches described in this section are not prior art to the claims in this application and are not admitted to be prior art by inclusion in this section.

Digital video may be encoded in an interlaced format. For example, a digital video may be interlaced to reduce the bandwidth to broadcast the digital video. As another example, a digital video may be interlaced to facilitate displaying the digital video on a display capable of rendering interlaced digital video (e.g., Cathode Ray Tube (CRT) displays, Alternate lighting of surfaces (ALiS) Plasma displays, or others). However, other types of displays may not be capable of rendering an interlaced digital video (e.g., Liquid Crystal Displays (LCD's), computer monitors, or others). Accordingly, an interlaced digital video may be "de-interlaced" in order to make the digital video compatible with some displays.

Additionally, a digital video may have a corresponding frame rate (or frequency). The frame rate may be expressed as frames per second (FPS) or represented in Hertz (Hz). A digital video may have any number of FPS. For example, some digital videos may have a frame rate of less than 100 Hz. As a further example, some digital videos used for viewing television programs may have a frame rate of between 24 and 60 Hz. Some displays (e.g., some high-definition (HD) displays) may have a display frequency of 100 Hz or more. As such, the frame rate of some digital videos may be increased (referred to as "frame rate up-conversion") in order to make the digital video compatible with some displays.

SUMMARY

Detailed herein are various methods for de-interlacing an interlaced digital video. Example methods may include estimating, on a computing device, a first progressive scan video frame based at least in part on an interlaced video frame from the interlaced video and generating a second progressive scan video frame based at least in part on application of a nonlocal means filter to the estimated first progressive scan video frame.

Alternatively or additionally detailed herein are various methods for up-converting the frame rate of a digital video. Examples methods may include inserting, by a computing device, an interpolated video frame between a first video frame and a second video frame of the digital video, determining, for each pixel in the interpolated video frame, whether the pixel is a background pixel based at least in part on pixels in the first video frame and pixels in the second video frame, setting, in response to determination that the pixel in the interpolated video frame is a background pixel, a value of the pixel in the interpolated video frame based at least in part upon the value of the corresponding pixel in the first video frame and the value of the corresponding pixel in the second video frame, and setting, in response to determination that the pixel in the interpolated video frame is not a background pixel, the value of the pixel in the interpolated video frame based at least in part on application of a nonlocal means filter to the first video frame and the second video frame.

The present disclosure also describes various example machine-readable non-transitory storage medium having stored therein instructions that, when executed by one or more processors, operatively enable a de-interlacing tool to estimate a first progressive scan video frame based at least in part on an interlaced video frame from an interlaced video and generate a second progressive scan video frame based at least in part on application of a nonlocal means filter to the estimated first progressive scan video frame.

Alternatively or additionally detailed herein are various example machine readable non-transitory storage medium having stored therein instructions that, when executed by one or more processors, operatively enable a frame rate up-conversion (FRUC) tool to insert an interpolated video frame between a first video frame and a second video frame of a digital video, determine, for each pixel in the interpolated video frame, whether the pixel is a background pixel based at least in part on pixels in the first video frame and pixels in the second video frame, set, in response to determination that the pixel in the interpolated video frame is a background pixel, a value of the pixel in the interpolated video frame based at least in part on a value of a corresponding pixel in the first video frame and a value of a corresponding pixel in the second video frame, and set, in response to determination that the pixel in the interpolated video frame is not a background pixel, the value of the pixel in the interpolated video frame based at least in part on application of a nonlocal means filter to the first video frame and the second video frame.

The present disclosure additionally describes example systems for de-interlacing an interlaced digital video. Example systems may include a processor, a de-interlacing tool communicatively coupled to the processor, the de-interlacing tool including a frame estimation module configured to estimate a first progressive scan video frame based at least in part on an interlaced video frame from an interlaced video, and a filter module coupled to the frame estimation module and configured to generate a second progressive scan video frame based at least in part upon applying a nonlocal means filter to the estimated first progressive scan video frame.

Alternatively or additionally detailed herein are example systems for up-converting the frame rate of a digital video. Example systems may include a processor and a frame rate up-conversion (FRUC) tool communicatively coupled to the processor, the FRUC tool configured to insert an interpolated video frame between a first video frame and a second video frame of the video. The FRUC tool including a background determination module configured to determine, for each pixel in the interpolated video frame, whether the pixel is a background pixel based at least in part upon the pixels in the first video frame and the pixels in the second video frame. The FRUC tool further including a filter module coupled to the determination module and configured to set, in response to determination that the pixel in the interpolated video frame is a background pixel, a value of the pixel in the interpolated video frame based at least in part on a value of a corresponding pixel in the first video frame and a value of the corresponding pixel in the second video frame, the filter module is further configured to set, in response to determination that the pixel in the interpolated video frame is not a background pixel, the value of the pixel in the interpolated video frame based at least in part on application of a nonlocal means filter to the first video frame and the second video frame.

The foregoing summary is illustrative only and not intended to be in any way limiting. In addition to the illustrative aspects, embodiments, and features described above, further aspects, embodiments, and features will become apparent by reference to the drawings and the following detailed description, which are also illustrative only and not intended to be limiting.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings:

FIG. 7 illustrates an example computer program product;

DETAILED DESCRIPTION

Figure 1:
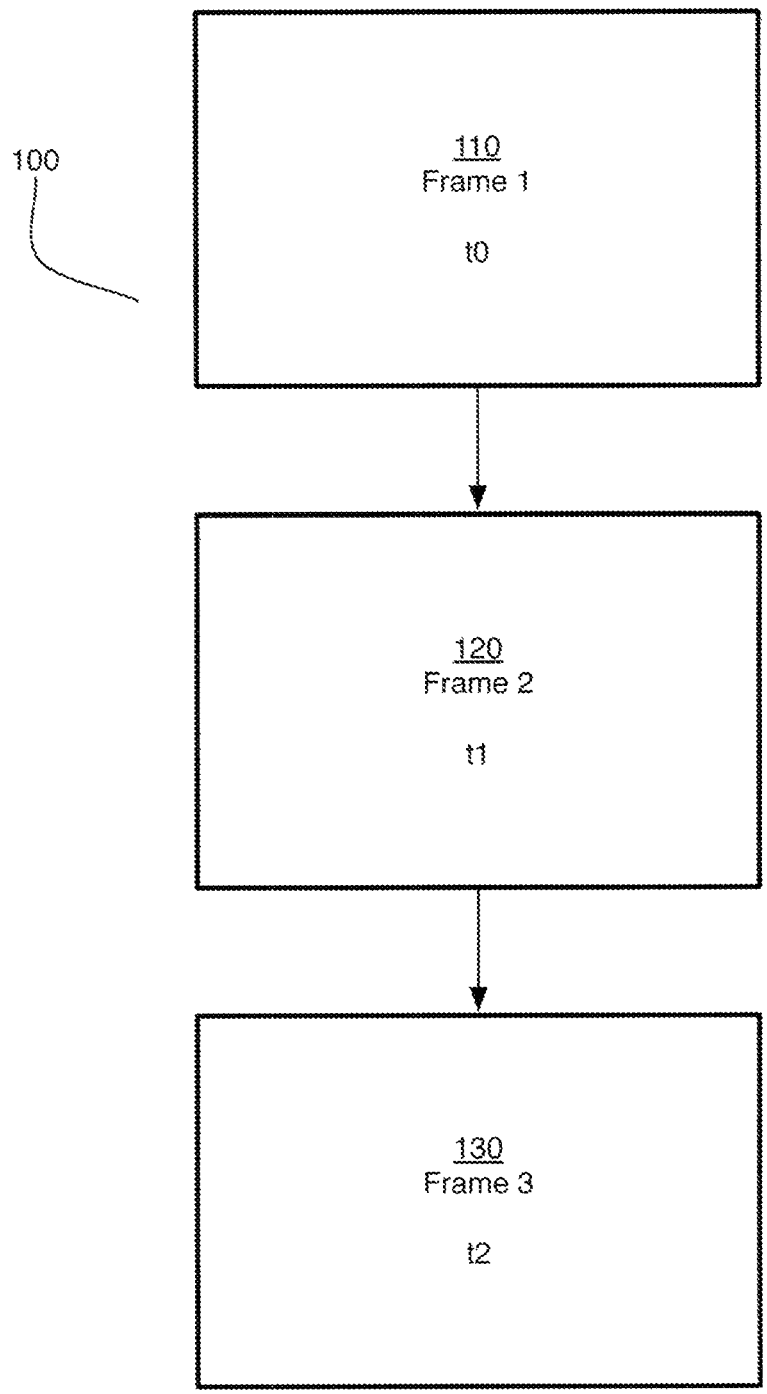
FIG. 1 illustrates a block diagram of an example digital video.

The following description sets forth various examples along with specific details to provide a thorough understanding of the present disclosure. The various embodiments may be practiced without some or more of the specific details disclosed herein. Further, in some circumstances, well-known methods, procedures, systems, components and/or circuits have not been described in detail, for the sake of brevity and clarity.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, devices, systems and computer readable media related to de-interlacing an interlaced digital video. Additionally, the present disclosure is drawn, inter alia, to methods, devices, systems and computer readable media related to up-converting the frame rate of a digital video.

De-Interlacing

In general, an interlaced digital video may include a number of frames, with each frame captured at succeeding time periods. For example, FIG. 1 illustrates a block diagram of an exemplary digital video 100, arranged in accordance with at least some embodiments of the present disclosure. As depicted, the digital video 100 includes frames 110, 120, and 130, captured at respective times t0, t1, and t2. Each frame in an interlaced digital video may include either even or odd lines of resolution, with alternating frames containing opposite lines of resolution. For example, assuming the digital video 100 represented an interlaced digital video, the frame 110 may contain even lines of resolution, the frame 120 may contain odd lines of resolution, and the frame 130 may contain even lines of resolution. Each of the lines of resolution in the frames 110, 120, and/or 130 may include a number of pixels. However, the pixels are not represented in FIG. 1 for clarity and simplicity of presentation.

Rendering an interlaced digital video (e.g., on a television, on a computer display, by a projector, or the like) may include displaying the lines of resolution from consecutive frames. For example, the lines of resolution from frame 110 may be displayed, followed by the lines of resolution from frame 120, followed by the lines of resolution from frame 130, and so forth.

Conversely, progressive scan digital video may include a number of frames that each includes both the even and odd lines of resolution, where each frame is captured at succeeding points in time. Referencing the frames 110, 120, and 130 depicted in FIG. 1 again, assuming the digital video 100 represented a progressive scan digital video, each of the frames 110, 120, and 130 may include both the even and odd lines of resolution (and corresponding pixels).

Some displays (e.g., LCDs. HDTVs, and computer monitors, digital projectors, or the like) may not be capable of rendering interlaced digital video. Instead, such displays may only be capable of rendering progressive scan digital video. Accordingly, in order to make an interlaced digital video compatible with such displays, the interlaced digital video may be "de-interlaced." In general, de-interlacing an interlaced digital video includes generating a de-interlaced frame having both even and odd lines of resolution for each frame of the interlaced digital video. Conventional techniques for de-interlacing an interlaced digital video may result in movement artifacts being represented in the de-interlaced digital video frame. This may be manifest as a flicker (also referred to as combing) in the de-interlaced digital video when it is displayed.

Various embodiments of the present disclosure may be provided to de-interlace an interlaced digital video. Otherwise stated, an interlaced digital video may be de-interlaced, based on various embodiments of the present disclosure, by generating de-interlaced digital video frames from the interlaced digital video frames. The following example is provided for illustrative purposes only, and like all other examples provided herein, is not intended to be limiting. A de-interlacing tool may be configured, based on at least some embodiments of the present disclosure, to generate de-interlaced digital video frames from interlaced digital video frames. The de-interlacing tool may estimate a de-interlaced digital video frame from an interlaced digital video frame. For example, the de-interlacing tool may apply an edge-based line averaging method to an interlaced digital video frame to generate an estimated de-interlaced digital video frame. The de-interlacing tool may then initialize a non-local means (NLM) filter based on the estimated de-interlaced digital video frame. For example, values of the pixels represented in the estimated de-interlaced digital video frame may be used to initialize weights in the NLM filter. The de-interlacing tool may then generate a de-interlaced digital video frame by applying the NLM filter to the interlaced digital video frame. For example, the de-interlacing tool may receive as input the interlaced digital video frame, apply the interlaced digital video frame to the NLM filter to determine the missing lines of resolution (e.g., either the even lines or the odd lines), and output the de-interlaced digital video. As a result, a de-interlaced digital video frame including both even and odd lines of resolution may be generated.

Figure 2:
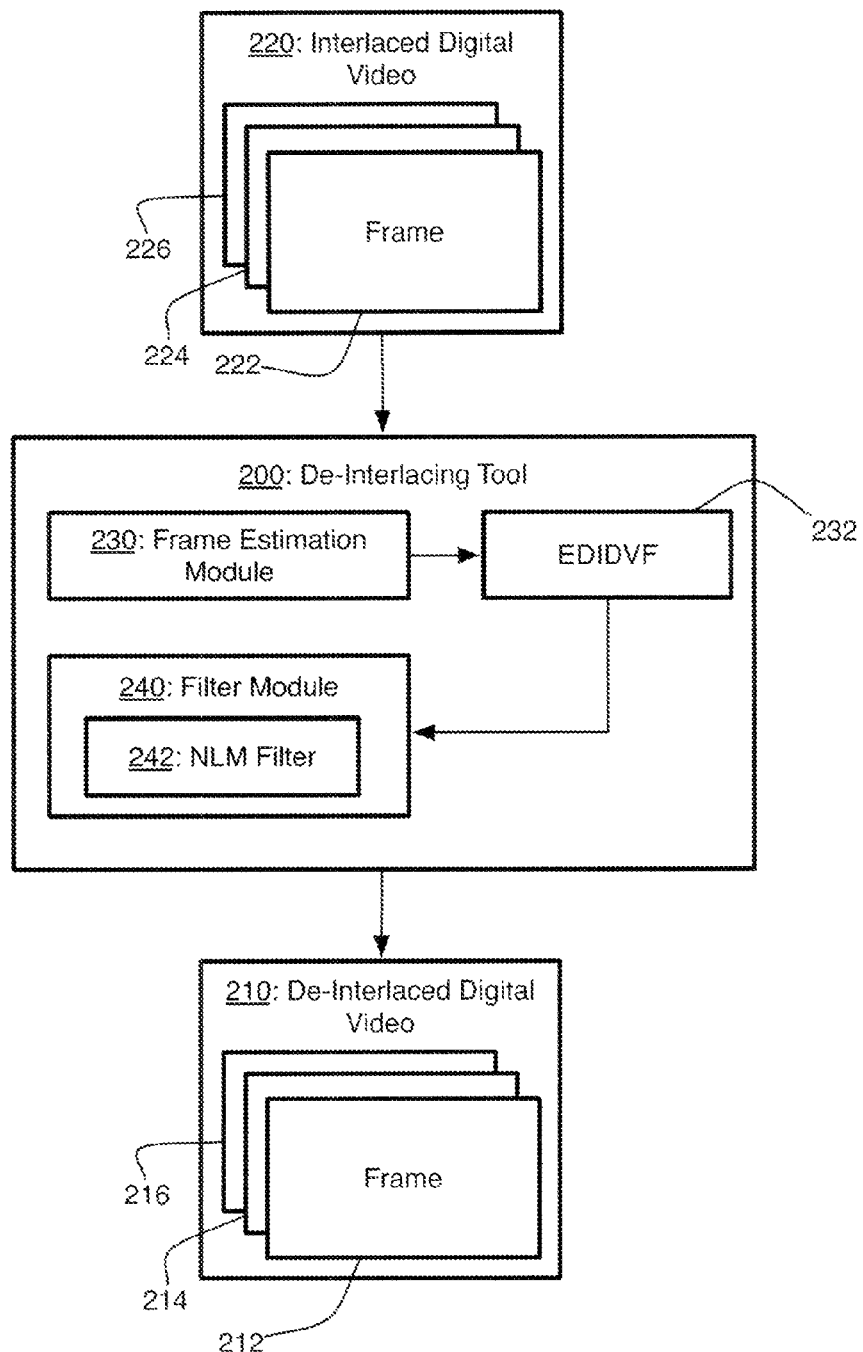
FIG. 2 illustrates a block diagram of an example de-interlacing tool.

FIG. 2 illustrates a block diagram of an example de-interlacing tool 200 that may be provided to generate a de-interlaced digital video from an interlaced digital video, arranged in accordance with at least some embodiments of the present disclosure.

As depicted, the de-interlacing tool 200 may be configured to generate a de-interlaced digital video 210 from an interlaced digital video 220. The interlaced digital video 220 is shown including frames 222, 224, and 226. Similarly, the de-interlaced digital video 210 is shown including frames 212, 214, and 216. A digital video (e.g., the de-interlaced digital video 210, and/or the interlaced digital video 220) may include any number of frames.

In general, the de-interlacing tool 200 may take as input the interlaced digital video 220 and output the de-interlaced digital video 210. The de-interlacing tool 200 may include a frame estimation module 230. The frame estimation module 230 may be configured to generate an estimated de-interlaced digital video frame (EDIDVF) 232 from one or more frames (e.g., the frames 222, 224, and/or 226) of the interlaced digital video 220. Additionally, the de-interlacing tool 200 may include a filter module 240 having a NLM filter 242. The filter module 240 may be configured to initialize the NLM filter 242 from the EDIDVF 232 and apply the initialized NLM filter 242 to a frame (e.g., the frame 222, 224, or 226) of the interlaced digital video 220 to generate a frame (e.g., the frame 212, 214, or 216) of the de-interlaced digital video 210. The various illustrated elements (e.g., the frame estimation module 230, the filter module 240, the NLM filter 242, and/or other components) of the de-interlacing tool 200 may be operatively or communicatively coupled to each other, so as to perform their operations described herein.

Figure 3:
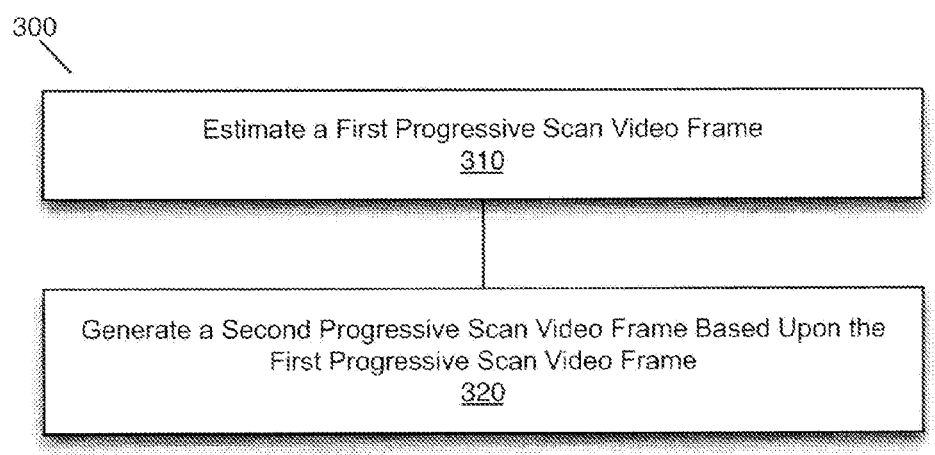
FIG. 3 illustrates a flow chart of an example method for de-interlacing an interlaced digital video.

FIG. 3 illustrates a flow chart of an example method 300 for de-interlacing an interlaced digital video, arranged in accordance with at least some embodiments of the present disclosure. This figure employs block diagrams to illustrate the example methods detailed therein. These block diagrams may set out various functional blocks or actions that may be described as processing steps, functional operations, events and/or acts, etc., and may be performed by hardware, software, firmware, and/or combination thereof, and need not necessarily be performed in the exact order shown. Numerous alternatives or additions to the functional blocks detailed (and/or combinations thereof) may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described and other rearrangements, substitutions, changes, modifications, etc., may be made without departing from the scope of claimed subject matter.

Additionally, FIG. 3 is described with reference to elements of the de-interlacing tool 200 tool 200 depicted in FIG. 2. However, the described embodiments are not limited to this depiction. More specifically, some elements depicted in FIG. 2 may be omitted from example implementations of the methods detailed herein. Additionally, other elements not depicted in FIG. 2 may be used to implement example methods.

Turning now to the method 300 and FIG. 3, beginning at block 310, "Estimate a First Progressive Scan Video Frame", the frame estimation module 230 may include logic and/or features configured to generate the EDIDVF 232 from the interlaced digital video 220. More particularly, at block 310, the frame estimation module 230 may estimate values for the pixels in the missing lines of resolution for a frame (e.g., the frame 222, 224, or 226) of the interlaced digital video 220. For example, assuming the frame 222 included even lines of resolution, the frame estimation module 230 may estimate values of the pixels for the odd lines of resolution in the frame 222.

Figure 4:
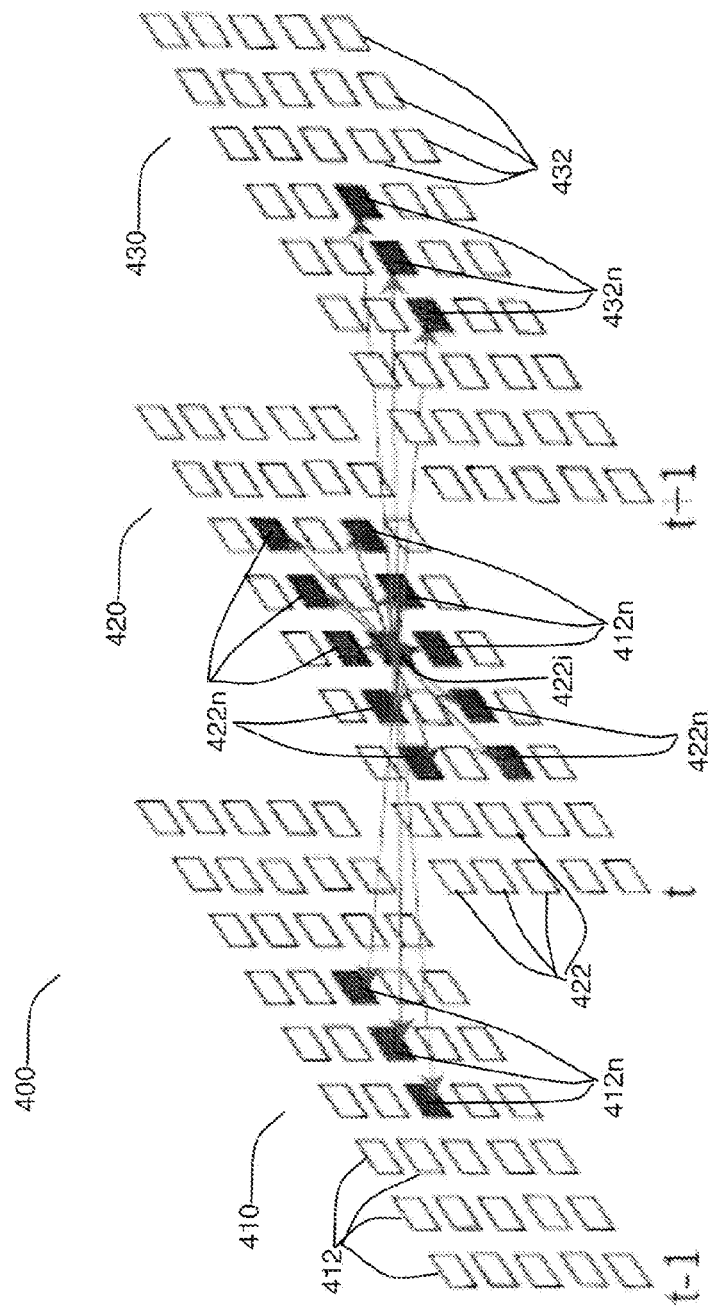
FIG. 4 illustrates a block diagram of an example estimated de-interlaced digital video.

In some embodiments, the frame estimation module 230 may generate the EDIDVF 232 using an edge-based line averaging technique. With some embodiments, the frame estimation module 230 may estimate the value of the pixels corresponding to the missing lines of resolution by interpolating the pixel values based on a number of interpolation directions. For example, turning to FIG. 4, FIG. 4 illustrates a block diagram of an example estimated de-interlaced digital video 400, arranged in accordance with at least some embodiments of the present disclosure. As depicted, the estimated de-interlaced digital video 400 may include a first frame 410 having pixels 412, a second frame 420 having pixels 422, and a third frame 430 having pixels 432. As further depicted, the frames 410, 420, and 430 respectively, are captured at times t−1, t, and t+1.

As stated, at block 310, the frame estimation module 230 may estimate the value of the missing pixels by interpolating the values based on a number of different interpolation directions. For example, the frame estimation module 230 may estimate the value of the pixel 422$i$ in the frame 422 based on the values of the pixels 412$n$, 422$n$, and 432$n$ shown in FIG. 4. As depicted, eight different interpolation directions (indicated by arrows) are shown between the pixel 422$i$ and the pixels 412$n$, 422$n$, and 432$n$. Accordingly, the frame estimation module may determine which one or more of these directions to use to interpolate the value of the pixel 422$i$.

For example, letting the missing pixel 422$i$ (also referred to as the interlaced pixel) be represented as g(i,j,t), the differences of the direction may be expressed as follows, where {1,2,3,4,5} correspond to the directions depicted between the pixels 422$n$ in FIG. 4 and {6,7,8} correspond to the directions depicted between the pixels 412$n$ and 432$n$.

$$d_c(n)=|g(i-1,j-m,t)-g(i+1,j+m,t)|, n\in\{1,2,3,4,5\}, m\in\{0\pm1,\pm2\}$$

$$d_c(n)=|g(i,j-m,t-1)-g(i,j+m,t+1)|, n\in\{6,7,8\}, m\in\{0\pm1\}$$

Additionally, the frame estimation module may consider the pixels above and below the pixel being estimated. For example, the following equations may be used to determine a particular or best direction for interpolation of the pixels above the pixel being interpolated.

$$d_a(n)=|g(i-2,j-m,t)-g(i,j+m,t)|, n\in\{1,2,3,4,5\}, m\in\{0\pm1,\pm2\}$$

$$d_a(n)=|g(i-1,j-m,t-1)-g(i-1,j+m,t+1)|, n\in\{6,7,8\}, m\in\{0\pm1\}$$

$$\text{Best1}=\text{argmin}_{1\leq n\leq 8}|d_a(n)-g(i-1,j,t)|$$

Similarly, the following equations may be used to determine a particular or best direction for interpolation of the pixels below the pixel being interpolated.

$$d_c(n)=|g(i,j-m,t)-g(i+2,j+m,t)|, n\in\{1,2,3,4,5\}, m\in\{0\pm1, \pm2\}$$

$$d_c(n)=|g(i+1,j-m,t-1)-g(i+1,j+m,t+1)|, n\in\{6,7,8\}, m\in\{0\pm1\}$$

$$\text{Best1}=\text{argmin}_{1\leq n\leq 8}|d_b(n)-g(i+1,j,t)|$$

In some examples, the frame estimation module may determine whether the minimum difference in directions is temporal (e.g., $d_c(6)$, $d_c(7)$, or $d_c(8)$) and whether a particular or best direction for at least one of the pixels above or below the pixel 422i is also temporal. The frame estimation module 230 may determine the value of the pixel 422i using the interpolation direction with the determined minimum difference based on the determination that the direction with the minimum difference is temporal and that a particular or best direction for at least one of the above or below pixels is also temporal.

Additionally, the frame estimation module 230 may determine whether the minimum difference in directions from directions {1,2,3,4,5} is near horizontal (e.g., $d_c(4)$, or $d_c(5)$). The frame estimation module 230 may determine the value of the pixel 422i using the interpolation direction with the determined minimum difference from directions {1,2,3,4,5} based on the determination that the direction with the minimum difference is not near horizontal.

Additionally, the frame estimation module 230 may determine whether a particular or best direction for interpolation of both the above and below pixels is near horizontal. The frame estimation module 230 may determine the value of the pixel 422i using the interpolation direction with the determined minimum difference from directions {1,2,3,4,5} based on the determination that the direction with the minimum difference is near horizontal and that a particular or best direction for interpolation of the above and below pixels is also near horizontal. The frame estimation module 230 may determine the value of the pixel 422i using the interpolation direction with the determined minimum difference from directions {1,2,3, 4,5} based on the determination that the direction with the minimum difference is near horizontal and that a particular or best direction for interpolation of the pixels above and below the pixel 422i is not near horizontal.

In some examples, the frame estimation module 230 may determine whether the minimum difference in direction for the pixel 422i is near horizontal (e.g. $d_c(4)$, or $d_c(5)$). The frame estimation module 230 may additionally determine whether a particular or best direction for interpolation of pixels above and below the pixel 422i is also near horizontal. The frame estimation module 230 may determine the value of the pixel 422i using the interpolation direction with the determined minimum difference based on the determination that the direction with the minimum difference is near horizontal and a particular or best direction for the above and below pixels is also near horizontal.

Additionally, the frame estimation module 230 may determine whether the minimum difference in directions from directions {1,2,3,6,7,8} is temporal. The frame estimation module 230 may determine the value of the pixel 422i using the interpolation direction with the determined minimum difference from directions {1,2,3,6,7,8} based on the determination that the direction with the minimum difference is not temporal.

Additionally, the frame estimation module 230 may determine whether a particular or best direction for interpolation of either one of the pixels above or below the pixel 422i is near temporal. The frame estimation module 230 may determine the value of the pixel 422i using the interpolation direction with the determined minimum difference from directions {1,2,3,6,7,8} based on the determination that the direction with the minimum difference is temporal and that a particular or best direction for interpolation of either of the above or below pixels is also temporal. The frame estimation module 230 may determine the value of the pixel 422i using the interpolation direction with the determined minimum difference from directions {1,2,3,6,7,8} based on the determination that the direction with the minimum difference is temporal and that a particular or best direction for interpolation of the pixels above and below the pixel 422i is not temporal.

Continuing from block 310 to block 320, "Generate a Second Progressive Scan Video Frame Based Upon the First Progressive Scan Video Frame", the filter module 240 may include logic and/or features configured to generate a de-interlaced digital video frame by applying a NLM filter to an interlaced digital video frame. For example, the filter module 240 may initialize weights in the NLM filter 242 based on the EDIDVF 232 and apply initialized NLM filter 242 to the interlaced digital video frame (e.g., the frame 222, 224, or 226) to generate a de-interlaced digital video frame (e.g. the frame 212, 214, or 216).

In some embodiments, the filter module 240 may be configured to apply a locally adaptive NLM filter to an interlaced digital video frame. For example, the NLM filter 242 may be a locally adaptive NLM filter. The NLM filter 242 may use a similarity window to adapt to different regions in the interlaced digital video frame where a pixel value is being interpolated. In further examples, a kernel matrix (also referred to as a "steering kernel") may be used to determine the "size" of the similarity window. For example, the kernel matrix may assign weights to every pixel in the similarity window. In some embodiments, the kernel matrix may use a symmetric function (e.g., Gaussian, exponential, or the like) to assign a weight to each pixel in the similarity window, with pixels closer to the central region of the similarity window having higher weight values than pixels further from the central region of the similarity window. As a result, the effective size of the similarity window may be adjusted.

In some embodiments, the filter module 240 may determine the steering kernel for the NLM filter 242 based on the following $$G\begin{bmatrix} \vdots & \vdots \\ d_x(i,j) & d_y(i,j) \\ \vdots & \vdots \end{bmatrix} = USV^T$$

Where G (local gradient matrix) is an $L^2\times 2$ matrix, $d_x(.)$ and $d_y(.)$ are the first derivatives along the x and y directions, and $USV^T$ is the singular value decomposition of G. Using the following definitions for the derivatives:

$$d_x(i,j)=(g(i,j+1)-g(i,j-1))/2$$

$$d_y(i,j)=(g(i-1,j)-g(i+1,j))/2$$

where g(i,j) is the pixel intensity value of the ith row and jth column of the EDIDVF 232.

The dominant orientation angle ($\Theta$) may be determined based on the following, where the second column of V is $v_2=[v_1, v_2]^T$.

$$\Theta = \arctan\left(\frac{v_1}{v_2}\right)$$

The elongation parameter (σ) may be determined based on the following, where $s_1$ and $s_2$ are diagonal elements of S.

$$\sigma = \frac{s_1 + 1}{s_2 + 1}$$

The scaling factor (γ) may be determined based on the following, where the size of the similarity window is L=2×f+1.

$$\gamma = \frac{f^2}{\sqrt{s_1 s_2 + 0.01}}$$

The Gaussian kernel matrix may be determined based on the following.

$$K = [k(i, j)]$$

$$k(i, j) = \exp\left(-\frac{\left(\frac{i'}{\gamma\sigma}\right)^2 + \left(\frac{j'\sigma}{\gamma}\right)^2}{2}\right)$$

$$i' = (i - f - 1)\cos\Theta + (j - f - 1)\sin\Theta$$

$$j' = (j - f - 1)\cos\Theta - (i - f - 1)\sin\Theta$$

In some embodiments, the filter module 240 may determine the weights (w) of the NLM filter 242 based on the following equation.

$$w(c(N_m, N_n)) = \frac{1}{Z(n)} e^{-\frac{c(N_m, N_n)}{h^2}}$$

$$z(n) = \sum_{m \in T} e^{-\frac{c(N_m, N_n)}{h^2}}$$

$$c(N_m, N_n) = \sum_{i=1}^{L} \sum_{j=1}^{L} k(i, j)(N_m(i, j) - N_n(i, j))^2$$

In some embodiments, the filter module 240 may determine the value of the pixel 422i based on the following equation where g(m) is the pixel with original value in search space (s).

$$\hat{f}(n) = \sum_{m \in S} w(c(N_m, N_n)) g(m)$$

In some embodiments, the filter module 240 may be configured to apply the NLM filter 242 to a frame of an interlaced digital video using a search space containing pixels from the current, previous, and next frame.

In some embodiments, the filter module 240 may be configured to apply the NLM filter 242 to a frame of an interlaced digital video such that the pixels whose neighborhood radiometric distance is substantially larger than the smallest neighborhood radiometric distance are ignored.

Frame Rate Up-Conversion

Digital videos may include a number of frames. Displaying the digital video may include rendering the frames in succeeding increments (e.g., a set number of frames per second, or the like). The number of frames to be viewed per second may be referred to as the frame rate or frequency. Some digital videos may be recorded, encoded, or sampled at less than 100 Hz. For example, many digital videos used for viewing television programs may have a frame rate of between 24 and 60 Hz. Additionally, the frame rate of a digital video may be down-sampled to reduce the bandwidth required to transmit or store the digital video.

Some displays (e.g., some high-definition (HD) displays) may have a display frequency of 100 Hz or more. As such, the frame rate of some digital videos may be increased (referred to as "frame rate up-conversion") in order to make the digital video compatible with some displays. Additionally, the frame rate of a digital video may be increased ("up-converted") to increase the visual quality of the digital video. Additionally, the frame rate of a digital video may be up-converted to compensate for any down sampling that may have taken place prior to transmission of the digital video.

Various embodiments of the present disclosure may be provided to up-convert the frame rate of a digital video. The following example is provided for illustrative purposes only, and like all other examples provided herein, is not intended to be limiting. A frame rate up-conversion (FRUC) tool may be configured, based on at least some embodiments of the present disclosure, to generate an interpolated digital video frame to be inserted between a first digital video frame and a second digital video frame of a digital video. Additionally, the FRUC tool may determine, for each pixel in the interpolated digital video frame, whether the pixel is a background pixel. For example, the FRUC tool may determine whether a pixel is a background pixel using background subtraction. Additionally, the FRUC tool may determine whether the corresponding pixel in the first video frame and the corresponding pixel in the second video frame have substantially the same value. The FRUC tool may set the value of the pixel substantially equal to the value of the corresponding pixel in the first and second video frame based on the determination that the pixel is a background pixel and the value of the corresponding pixels in the first and second video frames are substantially the same.

The FRUC tool may determine the value of remaining pixels in the interpolated digital video frame (e.g., value of the pixel is set based on the determination that the pixel is a background pixel and the value of the corresponding pixels in the first and second video frames are substantially the same) based on applying a NLM filter to the first digital video frame and the second digital video frame.

Figure 5:
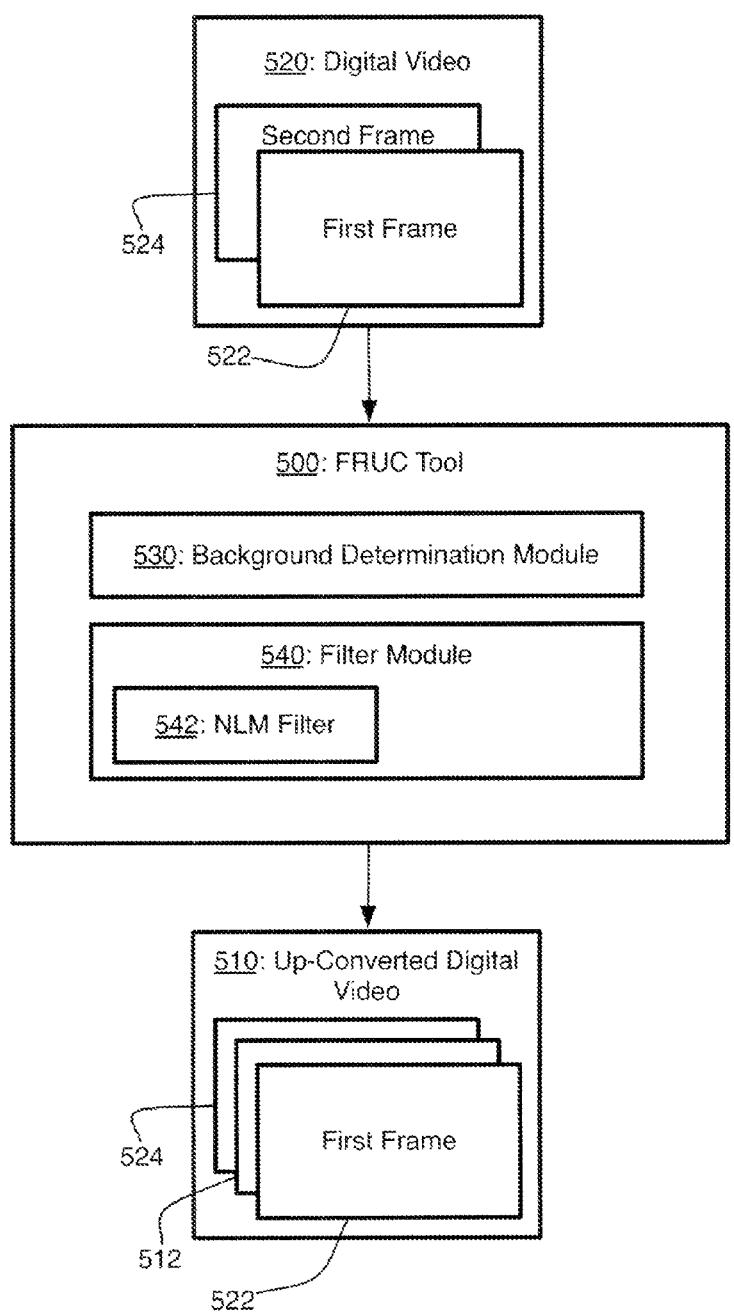
FIG. 5 illustrates a block diagram of an example frame rate up-conversion (FRUC) tool.

FIG. 5 illustrates a block diagram of an example FRUC tool 500 that may be provided to up-convert the frame rate of a digital video, arranged in accordance with at least some embodiments of the present disclosure.

As depicted, the FRUC tool 500 may be configured to generate an up-converted digital video 510 from a digital video 520. The digital video 520 is shown including a first frame 522 and a second frame 524. The up-converted digital video 510 is shown including the first frame 522, the second frame 524, and an interpolated frame 512 inserted between the first frame 522 and the second frame 524. A digital video (e.g., the digital video 520) may include any number of frames and that the FRUC tool 500 may be configured to insert a frame between any two frames in a digital video, or even multiple frames between any two frames in some embodiments.

In general, the FRUC tool 500 may take as input the digital video 520 and output the up-converted digital video 510. The FRUC tool 500 may include a background determination module 530. The background determination module 530 may be configured to determine whether the pixels in the interpolated frame 512 are "background" pixels. For example, the background determination module 530 may apply background subtraction to the frames 522 and 524 to determine whether the pixels in the interpolated frame 512 are background pixels. Additionally, the background determination module may be configured to determine whether corresponding pixels in the first video frame 522 and the second video frame 524 have substantially the same value. The background determination module 530 may be configured to set the value of a pixel in the interpolated video frame 512 to be substantially equal to the value of the corresponding pixels in the first video frame 522 and the second video frame 524 based on the determination that the pixel is a background pixel and that the corresponding pixels in the first video frame 522 and the second video frame 524 have substantially the same value.

Additionally, the FRUC tool 500 may include a filter module 540 having a NLM filter 542. The filter module 540 may be configured to determine the value of pixels in the interpolated video frame 512 based on applying the NLM filter 542 to the first video frame 522 and the second video frame 524. The various illustrated elements (e.g., the background determination module 530, the filter module 540, the NLM filter 542, and/or other components) of the FRUC tool 500 may be operatively or communicatively coupled to each other in some embodiments.

Figure 6:
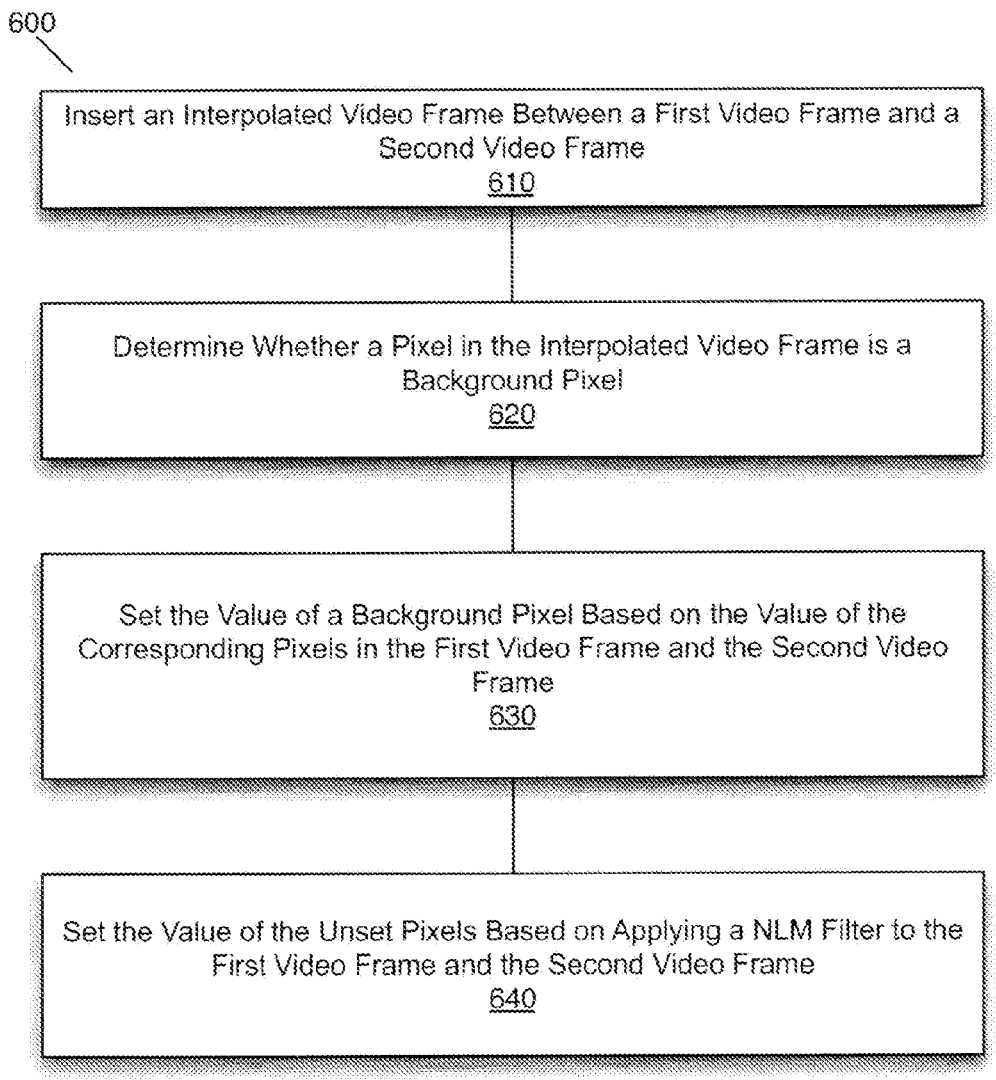
FIG. 6 illustrates a flow chart of an example method for up-converting the frame rate of a digital video.

FIG. 6 illustrates a flow chart of an example method 600 for up-converting the frame rate of a digital video, arranged in accordance with at least some embodiments of the present disclosure. This figure employs block diagrams to illustrate the example methods detailed therein. These block diagrams may set out various functional blocks or actions that may be described as processing steps, functional operations, events and/or acts, etc., and may be performed by hardware, software, firmware, and/or combination thereof, and need not necessarily be performed in the exact order shown. Numerous alternatives or additions to the functional blocks detailed (and/or combinations thereof) may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described and other rearrangements, substitutions, changes, modifications, etc. may be made without departing from the scope of claimed subject matter.

Additionally, FIG. 6 is described with reference to elements of the FRUC tool 500 depicted in FIG. 5. However, the described embodiments are not limited to this depiction. More specifically, some elements depicted in FIG. 5 may be omitted from example implementations of the methods detailed herein. Additionally, other elements not depicted in FIG. 5 may be used to implement example methods.

Turning now to the method 600 and FIG. 6, beginning at block 610, "Insert an Interpolated Video Frame Between a First Video Frame and a Second Video Frame", the FRUC tool 500 may include logic and/or features configured to generate the up-converted digital video 510 including the interpolated video frame 512 inserted between the first video frame 522 and the second video frame 524.

Continuing from block 610 to block 620, "Determine Whether a Pixel in the Interpolated Video Frame is a Background Pixel", the background determination module 530 may include logic and/or features configured to determine whether a pixel in the interpolated digital video frame 512 is a background pixel.

In some embodiments, the background determination module 530 may subtract the background pixels of the first video frame 522 from the background pixels in the second video frame 524. For example, the background determination module 530 may determine an average (e.g., using a Gaussian mixture model, or the like) of the background pixels in the first video frame 522 and subtract the average from the background pixels in the second video frame 524. The background determination module 530 may classify the remaining pixels as foreground pixels and any unclassified pixels as background pixels. In some embodiments, the background determination module may classify a pixel in the interpolated video frame 512 as a background pixel based on the determination that the corresponding pixel in the first video frame 522 and the corresponding pixel in the second video frame 524 are background pixels.

Continuing from block 620 to block 630, "Set the Value of a Background Pixel Based on the Value of the Corresponding Pixels in the First Video Frame and the Second Video Frame", the background determination module 530 may include logic and/or features configured to set the value of a pixel classified as a background pixel based on the value of the corresponding pixel in the first video frame 522 and the corresponding pixel in the second video frame 524.

In some embodiments, the background determination module 530 may be configured to determine whether the value of the corresponding pixel in the first video frame 522 and the value of the corresponding pixel in the second video frame 524 are substantially the same. The background determination module 530 may be configured to set the value of the pixel classified as a background pixel in the interpolated video frame 512 based on the determination that the value of the corresponding pixel in the first video frame 522 and the value of the corresponding pixel in the second video frame 524 are substantially the same.

Continuing from block 630 to block 640, "Set the Value of the Unset Pixels Based on Applying a NLM Filter to the First Video Frame and the Second Video Frame", the filter module 540 may include logic and/or features configured to set the value of an unset pixel in the interpolated video frame 512 based on applying the NLM filter 542 to the first video frame 522 and the second video frame 524.

In some embodiments, the filter module 540 may be configured to apply the NLM filter 542 to the first video frame 522 and the second video frame 524 based on a number of search regions (referred to as a "patches"). The filter module 540 may initialize the weights in the NLM filter 542 based on the pixels in the patches. In some examples, the filter module 540 may determine if the central pixel in a patch is classified as a background pixel. The filter module 540 may be configured to not include the patch when initializing the weights of the NLM filter 542 based on the determination that the central pixel in the patch is a background pixel.

In some embodiments, the filter module 540 may be configured to determine the value of pixels in the interpolated video frame 512 based on the following equation, where $N_{p1}$ is the patch in the first video frame 522 and $N_{p2}$ is a temporally symmetric patch in the second video frame 524, and y(p1), y(p2) are the central pixels in the patches.

$$\hat{f}(n) = \sum_{m \in T} w(c(N_{p1}, N_{p2}))(y(p1) + y(p2))/2$$

The weights (w) of the NLM filter 542 may be determined based on the following equation.

$$w(N_{p1}, N_{p2}) = \frac{1}{Z(n)} e^{-\frac{c(N_{p1}, N_{p2})}{h^2}}$$

$$Z(n) = \sum_{p1 \in T} e^{-\frac{c(N_{p1}, N_{p2})}{h^2}}$$

In some embodiments, the filter module 540 may be configured to apply the NLM filter 242 to the first video frame 522 and the second video frame 524 such that the patches whose radiometric distance is substantially larger than the smallest radiometric distance are ignored.

In some embodiments, the method described with respect to FIGS. 3, 6, and elsewhere herein may be implemented as a computer program product, executable on any suitable computing system, or the like. For example, a computer program product for facilitating fail-safe licensing of a software application may be provided. Example computer program products are described with respect to FIG. 7 and elsewhere herein.

FIG. 7 illustrates an example computer program product 700, arranged in accordance with at least some embodiments of the present disclosure. The computer program product 700 may include a machine-readable non-transitory medium having stored therein a plurality of instructions that, when executed (such as by one or more processors), operatively enable a de-Interlacing tool and/or a FRUC tool to de-interlace an interlaced digital video or up-convert the frame rate of a digital video according to the embodiments of the processes and methods discussed herein. The computer program product 700 of one embodiment may include a signal bearing medium 702. The signal bearing medium 702 may include one or more machine-readable instructions 704, which, when executed by one or more processors, may operatively enable a computing device to provide the functionality described herein. In various examples, the devices discussed herein may use some or all of the machine-readable instructions.

In some examples, the machine-readable instructions 704 may include estimating, on a computing device, a first progressive scan video frame based at least in part on an interlaced video frame from the interlaced video. In some examples, the machine-readable instructions 704 may include generating a second progressive scan video frame based at least in part on application of a nonlocal means filter to the estimated first progressive scan video frame.

In some examples, the machine-readable instructions 704 may include inserting, by a computing device, an interpolated video frame between a first video frame and a second video frame of the video. In some examples, the machine-readable instructions 704 may include determining, for each pixel in the interpolated video frame, whether the pixel is a background pixel based at least in part on pixels in the first video frame and pixels in the second video frame. In some examples, the machine-readable instructions 704 may include setting, in response to determination that the pixel in the interpolated video frame is a background pixel, a value of the pixel in the interpolated video frame based at least in part on a value of a corresponding pixel in the first video frame and a value of a corresponding pixel in the second video frame. In some examples, the machine-readable instructions 704 may include setting, in response to determination that the pixel in the interpolated video frame is not a background pixel, the value of the pixel in the interpolated video frame based at least in part on application of a nonlocal means filter to the first video frame and the second video frame.

In some implementations, signal bearing medium 702 may encompass a computer-readable medium 706, such as, but not limited to, a hard disk drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communication link, a wireless communication link, etc.). In some examples, the signal bearing medium 702 may encompass a machine readable non-transitory medium.

In general, at least some embodiments of the method described with respect to FIGS. 3, 6, and elsewhere herein may be implemented in any suitable server and/or computing system. Example systems may be described with respect to FIG. 8 and elsewhere herein. In general, the computer system may be configured to provide de-interlacing and frame rate up-conversion as described herein.

Figure 8:
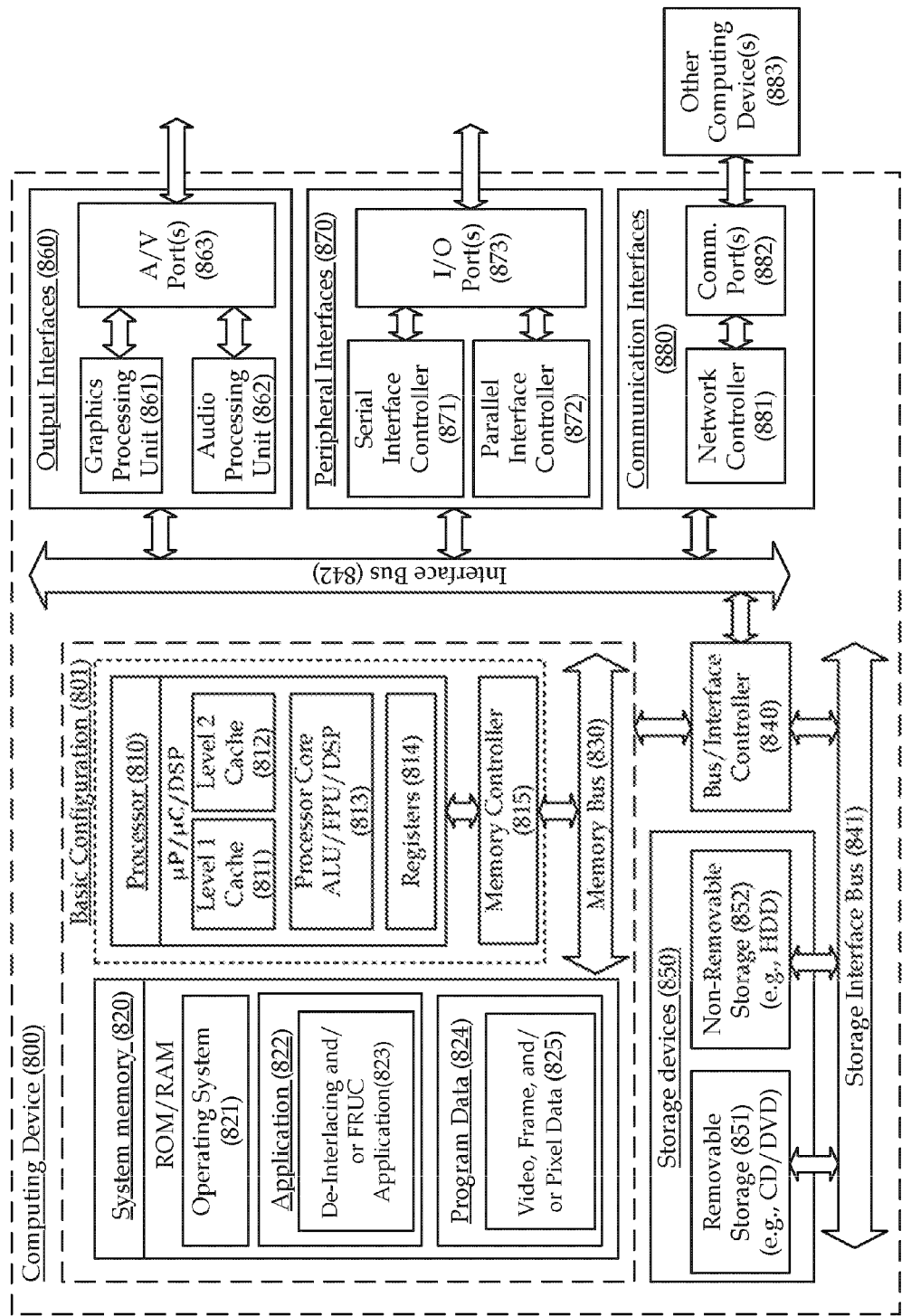
FIG. 8 illustrates a block diagram of an example computing device, all arranged in accordance with at least some embodiments of the present disclosure.

FIG. 8 is a block diagram illustrating an example computing device 800, arranged in accordance with at least some embodiments of the present disclosure. In various examples, the computing device 800 may be configured to de-interlace an interlaced digital video and/or up-convert the frame rate of a digital video as discussed herein. In one example of a configuration 801, the computing device 800 may include one or more processors 810 and a system memory 820. A memory bus 830 can be used for communicating between the one or more processors 810 and the system memory 820.

Depending on the particular configuration, the one or more processors 810 may be of any type including but not limited to a microprocessor (μP), a microcontroller (μC), a digital signal processor (DSP), or any combination thereof. The one or more processors 810 may include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the one or more processors 810, or in some implementations the memory controller 815 can be an internal part of the processor 810.

Depending on the particular configuration, the system memory 820 may be of any type including but not limited to volatile memory (such as RAM), non-volatile memory (such as ROM, flash memory, etc.) or any combination thereof. The system memory 820 may include an operating system 821, one or more applications 822, and program data 824. The one or more applications 822 may include a de-interlacing and/or FRUC application 823 that can be arranged to perform the functions, actions, and/or operations as described herein including the functional blocks, actions, and/or operations described herein. The program data 824 may include video, frame, and/or pixel data 825 (and also including values for the variables in the equations discussed above) for use with the de-interlacing and/or FRUC application 823. In some example embodiments, the one or more applications 822 may be arranged to operate with the program data 824 on the operating system 821. This described configuration 801 is illustrated in FIG. 8 by those components within dashed line.

The computing device 800 may have additional features or functionality, and additional interfaces to facilitate communications between the configuration 801 and any other devices and interfaces. For example, a bus/interface controller 840 may be used to facilitate communications between the configuration 801 and one or more data storage devices 850 via a storage interface bus 841. The one or more data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 820, the removable storage 851 and the non-removable storage 852 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store information and which may be accessed by the computing device 800. Any such computer storage media may be part of the computing device 800.

The computing device 800 may also include an interface bus 842 for facilitating communication from various interface devices (e.g., output interfaces, peripheral interfaces, and communication interfaces) to the configuration 801 via the bus/interface controller 840. Example output interfaces 860 may include a graphics processing unit 861 and an audio processing unit 862, which may be configured to communicate to various external devices such as a display or speakers via one or more A/V ports 863. Example peripheral interfaces 870 may include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 883 over a network communication via one or more communication ports 882. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 800 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 800 may also be implemented as a personal computer including both laptop computer and non-laptop computer configurations. In addition, the computing device 800 may be implemented as part of a wireless base station or other wireless system or device.

Some portions of the foregoing detailed description are presented in terms of algorithms or symbolic representations of operations on data bits or binary digital signals stored within a computing system memory, such as a computer memory. An algorithm is here, and generally, considered to be a self-consistent sequence of operations or similar processing leading to a particular result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. However, all of these and similar terms are to be associated with appropriate physical quantities and are merely convenient labels. Unless specifically stated otherwise, discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the particular vehicle for implementation will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware is possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

The devices and/or processes are described in the manner set forth herein, and thereafter engineering practices may be used to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The subject matter described herein sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated" such that the particular functionality is achieved. Hence, any two components herein combined to achieve a particular functionality can be seen as "associated with" each other such that the particular functionality is achieved, irrespective of architectures or intermedial components. Likewise, any two components so associated can also be viewed as being "operably connected", or "operably coupled", to each other to achieve the particular functionality, and any two components capable of being so associated can also be viewed as being "operably couplable", to each other to achieve the particular functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, the terms may be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense generally understood for the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense generally understood for the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Additionally, all of the above also applies with respect to the various usages of the terms "embodiment" or "embodiments."

While certain exemplary techniques have been described and shown herein using various methods and systems, various other modifications may be made, and equivalents may be substituted. Additionally, many modifications may be made to adapt a particular situation to the teachings of claimed subject matter without departing from the concept(s) described herein. Therefore, it is intended that claimed subject matter not be limited to the particular examples disclosed, but that such claimed subject matter also may include all implementations falling within the scope of the appended claims, and equivalents thereof.

What is claimed is:

1. A method to up-convert a video, the method comprising:
    inserting, by a computing device, an interpolated video frame between a first video frame and a second video frame of the video;
    determining, for each pixel in the interpolated video frame, whether the pixel is a background pixel based at least in part on pixels in the first video frame and pixels in the second video frame;
    setting, in response to determination that the pixel in the interpolated video frame is a background pixel, a value of the pixel in the interpolated video frame based at least in part on a value of a corresponding pixel in the first video frame and a value of a corresponding pixel in the second video frame; and
    setting, in response to determination that the pixel in the interpolated video frame is not a background pixel, the value of the pixel in the interpolated video frame based at least in part on application of a nonlocal means filter to the first video frame and the second video frame;
    wherein the setting, in response to determination that the pixel in the interpolated video frame is a background pixel, the value of the pixel in the interpolated video frame based at least in part on the value of the corresponding pixel in the first video frame and the value of the corresponding pixel in the second video frame includes:
        determining whether the corresponding pixel in the first video frame and the corresponding pixel in the second video frame have a substantially same value;
        setting, in response to determination that the corresponding pixel in the first video frame and the corresponding pixel in the second video frame have substantially the same value, the value of the pixel in the interpolated video frame to be substantially equal to either the value of the corresponding pixel in the first video frame or the value of the corresponding pixel in the second video frame; and
        setting, in response to determination that the corresponding pixel in the first video frame and the corresponding pixel in the second video frame do not have substantially the same value, the value of the pixel in the interpolated video frame based at least in part on application of the nonlocal means filter to the first video frame and the second video frame.

2. The method of claim 1, wherein the setting, in response to determination that the pixel in the interpolated video frame is not a background pixel, the value of the pixel in the interpolated video frame based at least in part on application of the nonlocal means filter to the first video frame and the second video frame includes:
    identifying one or more patches of pixels in the first video frame;
    identifying one or more patches of pixels in the second video frame, wherein the one or more patches of pixels in the second video frame are temporally symmetric to the one or more patches of pixels in the first video frame; and
    determining the value for the pixel in the interpolated video frame based at least in part on a weighted average of a value of pixels in the one or more patches of pixels in the first video frame and a value of pixels in the one or more patches of pixels in the second video frame.

3. The method of claim 1, wherein the setting, in response to determination that the pixel in the interpolated video frame is not a background pixel, the value of the pixel in the interpolated video frame based at least in part on application of the nonlocal means filter to the first video frame and the second video frame includes:
    identifying a patch of pixels in the first video frame;
    identifying a patch of pixels in the second video frame, wherein the patch of pixels in the second video frame is temporally symmetric to the patch of pixels in the first video frame;
    identifying a central pixel in the patch of pixels from the first video frame;
    determining whether the identified central pixel is a background pixel; and
    determining the value for the pixel in the interpolated video frame, based on the determining whether the identified central pixel is a background pixel, wherein the determining the value for the pixel in the interpolated video frame is further based at least in part on a weighted average of a value of pixels in the patch of pixels in the first video frame and a value of pixels in the patch of pixels in the second video frame.

4. The method of claim 3, wherein the determining the value for the pixel in the interpolated video frame, based on the determining whether the identified central pixel is a background pixel, and wherein the determining a value for the pixel in the interpolated video frame is based at least in part on a weighted average of the value of the pixels in the patch of pixels in the first video frame and the value of the pixels in the patch of pixels in the second video frame include:
    identifying a second central pixel in the patch of pixels from the second video frame; and
    determining an intensity distance based at least in part on the identified central pixel and the identified second central pixel;
    wherein the determining the value for the pixel in the interpolated video frame is further based at least in part on the determined intensity distance.

5. The method of claim 1, wherein the determining, for each pixel in the interpolated video frame, whether the pixel is a background pixel based at least in part on the pixels in the first video frame and the pixels in the second video frame includes:
    identifying one or more pixels from the first video frame as background pixels;
    identifying one or more pixels from the second video frame as background pixels; and
    subtracting the one or more identified background pixels from the first video frame from the one or more identified background pixels from the second video frame.

6. A machine readable non-transitory medium having stored therein instructions that, in response to execution by one or more processors, operatively enable a frame rate up-conversion (FRUC) tool to:
    insert an interpolated video frame between a first video frame and a second video frame of the video;
    determine, for each pixel in the interpolated video frame, whether the pixel is a background pixel based at least in part on pixels in the first video frame and pixels in the second video frame;
    set, in response to determination that the pixel in the interpolated video frame is a background pixel, a value of the pixel in the interpolated video frame based at least in part on a value of a corresponding pixel in the first video frame and a value of a corresponding pixel in the second video frame; and
    set, in response to determination that the pixel in the interpolated video frame is not a background pixel, the value of the pixel in the interpolated video frame based at least in part on application of a nonlocal means filter to the first video frame and the second video frame;
    wherein the stored instruction that operatively enable the FRUC tool to set, in response to determination that the pixel in the interpolated video frame is a background pixel, a value of the pixel in the interpolated video frame based at least in part on a value of a corresponding pixel in the first video frame and a value of a corresponding pixel in the second video frame include instructions that, in response to execution by one or more processors, operatively enable the FRUC tool to:
        determine whether the corresponding pixel in the first video frame and the corresponding pixel in the second video frame have substantially the same value;
        set, in response to determination that the corresponding pixel in the first video frame and the corresponding pixel in the second video frame have substantially the same value, the value of the pixel in the interpolated video frame to be substantially equal to either the value of the corresponding pixel in the first video frame or the value of the corresponding pixel in the second video frame; and
        set, in response to determination that the corresponding pixel in the first video frame and the corresponding pixel in the second video frame do not have substantially the same value, the value of the pixel in the interpolated video frame based at least in part on applying the nonlocal means filter to the first video frame and the second video frame.

7. The machine readable non-transitory medium of claim 6, wherein the stored instruction that operatively enable the FRUC tool to set, in response to determination that the pixel in the interpolated video frame is not a background pixel, the value of the pixel in the interpolated video frame based at least in part on application of a nonlocal means filter to the first video frame and the second video frame include instructions that, in response to execution by one or more processors, operatively enable the FRUC tool to:
    identify one or more patches of pixels in the first video frame;
    identify one or more patches of pixels in the second video frame, wherein the one or more patches of pixels in the second video frame are temporally symmetric to the one or more patches of pixels in the first video frame; and
    determine a value for the pixel in the interpolated video frame based at least in part on a weighted average of the value of the pixels in the one or more patches of pixels in the first video frame and the value of the pixels in the one or more patches of pixels in the second video frame.

8. The machine readable non-transitory medium of claim 6, wherein the stored instruction that operatively enable the FRUC tool to determine a value for the pixel in the interpolated video frame based at least in part on a weighted average of the value of the pixels in the one or more patches of pixels in the first video frame and the value of the pixels in the one or more patches of pixels in the second video frame include instructions that, in response to execution by one or more processors, operatively enable the FRUC tool to:
    identify a patch of pixels in the first video frame;
    identify a patch of pixels in the second video frame, wherein the patch of pixels in the second video frame is temporally symmetric to the patch of pixels in the first video frame;
    identify a central pixel in the patch of pixels from the first video frame;
    determine whether the identified central pixel is a background pixel; and
    determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame.

9. The machine readable non-transitory medium of claim 8, wherein the stored instructions that operatively enable the FRUC tool set to determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame include instructions that, in response to execution by one or more processors, operatively enable the FRUC tool to:
    identify a second central pixel in the patch of pixel from the second video frame; and
    determine an intensity distance based at least in part on the identified central pixel and the identified second central pixel;
    wherein the determining a value for the pixel in the interpolated video frame is further based at least in part on the determined intensity distance.

10. The machine readable non-transitory medium of claim 6, wherein the stored instruction that operatively enable the FRUC tool to determine, for each pixel in the interpolated video frame, whether the pixel is a background pixel based at least in part on pixels in the first video frame and pixels in the second video frame include instructions that, in response to execution by one or more processors, operatively enable the FRUC tool to:
    identify one or more pixels from the first video frame as background pixels;

identify one or more pixels from the second video frame as background pixels; and subtract the one or more identified background pixels from the first video frame from the one or more identified background pixels from the second video frame.

11. A system to upconvert the frame rate of a digital video comprising:

a processor; and a frame rate up-conversion (FRUC) tool communicatively coupled to the processor, the FRUC tool configured to:

insert an interpolated video frame between a first video frame and a second video frame of the video;

the FRUC tool including a background determination module configured to determine, for each pixel in the interpolated video frame, whether the pixel is a background pixel based at least in part on pixels in the first video frame and pixels in the second video frame;

the FRUC tool further including a filter module coupled to the background determination module and configured to set, in response to determination that the pixel in the interpolated video frame is a background pixel, a value of the pixel in the interpolated video frame based at least in part on a value of a corresponding pixel in the first video frame and a value of a corresponding pixel in the second video frame; and the filter module is further configured to set, in response to determination that the pixel in the interpolated video frame is not a background pixel, the value of the pixel in the interpolated video frame based at least in part on application of a nonlocal means filter to the first video frame and the second video frame;

wherein to determine, for each pixel in the interpolated video frame, whether the pixel is a background pixel based at least in part on pixels in the first video frame and pixels in the second video frame, the background determination module is configured to:

determine whether the corresponding pixel in the first video frame and the corresponding pixel in the second video frame have substantially the same value;

set, in response to determination that the corresponding pixel in the first video frame and the corresponding pixel in the second video frame have substantially the same value, the value of the pixel in the interpolated video frame to be substantially equal to either the value of the corresponding pixel in the first video frame or the value of the corresponding pixel in the second video frame; and set, in response to determination that the corresponding pixel in the first video frame and the corresponding pixel in the second video frame do not have substantially the same value, the value of the pixel in the interpolated video frame based at least in part on applying the nonlocal means filter to the first video frame and the second video frame.

12. The system of claim 11, wherein to set, in response to determination that the pixel in the interpolated video frame is not a background pixel, the value of the pixel in the interpolated video frame based at least in part on application of a nonlocal means filter to the first video frame and the second video frame, the filter module is further configured to:

identify one or more patches of pixels in the first video frame;

identify one or more patches of pixels in the second video frame, wherein the one or more patches of pixels in the second video frame are temporally symmetric to the one or more patches of pixels in the first video frame; and determine a value for the pixel in the interpolated video frame based at least in part on a weighted average of the value of the pixels in the one or more patches of pixels in the first video frame and the value of the pixels in the one or more patches of pixels in the second video frame.

13. The system of claim 11, wherein to set, in response to determination that the pixel in the interpolated video frame is not a background pixel, the value of the pixel in the interpolated video frame based at least in part on application of the nonlocal means filter to the first video frame and the second video frame, the filter module is further configured to:

identify a patch of pixels in the first video frame;

identify a patch of pixels in the second video frame, wherein the patch of pixels in the second video frame is temporally symmetric to the patch of pixels in the first video frame;

identify a central pixel in the patch of pixels from the first video frame;

determine whether the identified central pixel is a background pixel; and determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame.

14. The system of claim 13, wherein to determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame, the filter module is further configured to:

identify a second central pixel in the patch of pixel from the second video frame; and determine an intensity distance based at least in part on the identified central pixel and the identified second central pixel;

wherein the determining a value for the pixel in the interpolated video frame is further based at least in part on the determined intensity distance.

15. The system of claim 11, wherein to determine, for each pixel in the interpolated video frame, whether the pixel is a background pixel based at least in part on pixels in the first video frame and pixels in the second video frame, the background determination module is configured to:

identify one or more pixels from the first video frame as background pixels;

identify one or more pixels from the second video frame as background pixels; and subtract the one or more identified background pixels from the first video frame from the one or more identified background pixels from the second video frame.

16. A method to up-convert a video, the method comprising:

inserting, by a computing device, an interpolated video frame between a first video frame and a second video frame of the video;

determining, for each pixel in the interpolated video frame, whether the pixel is a background pixel based at least in part on pixels in the first video frame and pixels in the second video frame;

setting, in response to determination that the pixel in the interpolated video frame is a background pixel, a value of the pixel in the interpolated video frame based at least in part on a value of a corresponding pixel in the first video frame and a value of a corresponding pixel in the second video frame; and setting, in response to determination that the pixel in the interpolated video frame is not a background pixel, the value of the pixel in the interpolated video frame based at least in part on application of a nonlocal means filter to the first video frame and the second video frame;

wherein the setting, in response to determination that the pixel in the interpolated video frame is not a background pixel, the value of the pixel in the interpolated video frame based at least in part on application of the nonlocal means filter to the first video frame and the second video frame includes:

identifying one or more patches of pixels in the first video frame;

identifying one or more patches of pixels in the second video frame, wherein the one or more patches of pixels in the second video frame are temporally symmetric to the one or more patches of pixels in the first video frame; and determining the value for the pixel in the interpolated video frame based at least in part on a weighted average of a value of pixels in the one or more patches of pixels in the first video frame and a value of pixels in the one or more patches of pixels in the second video frame.

17. The method of claim 16 wherein the setting, in response to determination that the pixel in the interpolated video frame is not a background pixel, the value of the pixel in the interpolated video frame based at least in part on application of the nonlocal means filter to the first video frame and the second video frame includes:

identifying a patch of pixels in the first video frame;

identifying a patch of pixels in the second video frame, wherein the patch of pixels in the second video frame is temporally symmetric to the patch of pixels in the first video frame;

identifying a central pixel in the patch of pixels from the first video frame;

determining whether the identified central pixel is a background pixel; and determining the value for the pixel in the interpolated video frame, based on the determining whether the identified central pixel is a background pixel, wherein the determining the value for the pixel in the interpolated video frame is further based at least in part on a weighted average of a value of pixels in the patch of pixels in the first video frame and a value of pixels in the patch of pixels in the second video frame.

18. The method of claim 17, wherein the determining the value for the pixel in the interpolated video frame, based on the determining whether the identified central pixel is a background pixel, and wherein the determining a value for the pixel in the interpolated video frame is based at least in part on a weighted average of the value of the pixels in the patch of pixels in the first video frame and the value of the pixels in the patch of pixels in the second video frame include:

identifying a second central pixel in the patch of pixels from the second video frame; and determining an intensity distance based at least in part on the identified central pixel and the identified second central pixel;

wherein the determining the value for the pixel in the interpolated video frame is further based at least in part on the determined intensity distance.

19. A machine readable non-transitory medium having stored therein instructions that, in response to execution by one or more processors, operatively enable a frame rate up-conversion (FRUC) tool to:

insert an interpolated video frame between a first video frame and a second video frame of the video;

determine, for each pixel in the interpolated video frame, whether the pixel is a background pixel based at least in part on pixels in the first video frame and pixels in the second video frame;

set, in response to determination that the pixel in the interpolated video frame is a background pixel, a value of the pixel in the interpolated video frame based at least in part on a value of a corresponding pixel in the first video frame and a value of a corresponding pixel in the second video frame; and set, in response to determination that the pixel in the interpolated video frame is not a background pixel, the value of the pixel in the interpolated video frame based at least in part on application of a nonlocal means filter to the first video frame and the second video frame;

wherein the stored instruction that operatively enable the FRUC tool to set, in response to determination that the pixel in the interpolated video frame is not a background pixel, the value of the pixel in the interpolated video frame based at least in part on application of a nonlocal means filter to the first video frame and the second video frame include instructions that, in response to execution by one or more processors, operatively enable the FRUC tool to:

identify one or more patches of pixels in the first video frame;

identify one or more patches of pixels in the second video frame, wherein the one or more patches of pixels in the second video frame are temporally symmetric to the one or more patches of pixels in the first video frame; and determine a value for the pixel in the interpolated video frame based at least in part on a weighted average of the value of the pixels in the one or more patches of pixels in the first video frame and the value of the pixels in the one or more patches of pixels in the second video frame.

20. The machine readable non-transitory medium of claim 19, wherein the stored instruction that operatively enable the FRUC tool to determine a value for the pixel in the interpolated video frame based at least in part on a weighted average of the value of the pixels in the one or more patches of pixels in the first video frame and the value of the pixels in the one or more patches of pixels in the second video frame include instructions that, in response to execution by one or more processors, operatively enable the FRUC tool to:

identify a patch of pixels in the first video frame;

identify a patch of pixels in the second video frame, wherein the patch of pixels in the second video frame is temporally symmetric to the patch of pixels in the first video frame;

identify a central pixel in the patch of pixels from the first video frame;

determine whether the identified central pixel is a background pixel; and determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame.

21. The machine readable non-transitory medium of claim 20, wherein the stored instructions that operatively enable the FRUC tool set to determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame include instructions that, in response to execution by one or more processors, operatively enable the FRUC tool to:

identify a second central pixel in the patch of pixel from the second video frame; and determine an intensity distance based at least in part on the identified central pixel and the identified second central pixel;

wherein the determining a value for the pixel in the interpolated video frame is further based at least in part on the determined intensity distance.

22. A system to upconvert the frame rate of a digital video comprising:

a processor; and a frame rate up-conversion (FRUC) tool communicatively coupled to the processor, the FRUC tool configured to:

insert an interpolated video frame between a first video frame and a second video frame of the video;

the FRUC tool including a background determination module configured to determine, for each pixel in the interpolated video frame, whether the pixel is a background pixel based at least in part on pixels in the first video frame and pixels in the second video frame;

the FRUC tool further including a filter module coupled to the background determination module and configured to set, in response to determination that the pixel in the interpolated video frame is a background pixel, a value of the pixel in the interpolated video frame based at least in part on a value of a corresponding pixel in the first video frame and a value of a corresponding pixel in the second video frame; and the filter module is further configured to set, in response to determination that the pixel in the interpolated video frame is not a background pixel, the value of the pixel in the interpolated video frame based at least in part on application of a nonlocal means filter to the first video frame and the second video frame;

wherein to set, in response to determination that the pixel in the interpolated video frame is not a background pixel, the value of the pixel in the interpolated video frame based at least in part on application of a nonlocal means filter to the first video frame and the second video frame, the filter module is further configured to:

identify one or more patches of pixels in the first video frame;

identify one or more patches of pixels in the second video frame, wherein the one or more patches of pixels in the second video frame are temporally symmetric to the one or more patches of pixels in the first video frame; and determine a value for the pixel in the interpolated video frame based at least in part on a weighted average of the value of the pixels in the one or more patches of pixels in the first video frame and the value of the pixels in the one or more patches of pixels in the second video frame.

23. The system of claim 22, wherein to set, in response to determination that the pixel in the interpolated video frame is not a background pixel, the value of the pixel in the interpolated video frame based at least in part on application of the nonlocal means filter to the first video frame and the second video frame, the filter module is further configured to:

identify a patch of pixels in the first video frame;

identify a patch of pixels in the second video frame, wherein the patch of pixels in the second video frame is temporally symmetric to the patch of pixels in the first video frame;

identify a central pixel in the patch of pixels from the first video frame;

determine whether the identified central pixel is a background pixel; and determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame.

24. The system of claim 23, wherein to determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame, the filter module is further configured to:

identify a second central pixel in the patch of pixel from the second video frame; and determine an intensity distance based at least in part on the identified central pixel and the identified second central pixel;

wherein the determining a value for the pixel in the interpolated video frame is further based at least in part on the determined intensity distance.

25. A method to up-convert a video, the method comprising:

inserting, by a computing device, an interpolated video frame between a first video frame and a second video frame of the video;

determining, for each pixel in the interpolated video frame, whether the pixel is a background pixel based at least in part on pixels in the first video frame and pixels in the second video frame;

setting, in response to determination that the pixel in the interpolated video frame is a background pixel, a value of the pixel in the interpolated video frame based at least in part on a value of a corresponding pixel in the first video frame and a value of a corresponding pixel in the second video frame;

setting, in response to determination that the pixel in the interpolated video frame is not a background pixel, the value of the pixel in the interpolated video frame based at least in part on application of a nonlocal means filter to the first video frame and the second video frame, wherein the setting, in response to determination that the pixel in the interpolated video frame is not a background pixel, the value of the pixel in the interpolated video frame based at least in part on application of the nonlocal means filter to the first video frame and the second video frame includes:

identifying a patch of pixels in the first video frame;

identifying a patch of pixels in the second video frame, wherein the patch of pixels in the second video frame is temporally symmetric to the patch of pixels in the first video frame;

identifying a central pixel in the patch of pixels from the first video frame;

determining whether the identified central pixel is a background pixel; and determining the value for the pixel in the interpolated video frame, based on the determining whether the identified central pixel is a background pixel, wherein the determining the value for the pixel in the interpolated video frame is further based at least in part on a weighted average of a value of pixels in the patch of pixels in the first video frame and a value of pixels in the patch of pixels in the second video frame.

26. The method of claim 25, wherein the determining the value for the pixel in the interpolated video frame, based on the determining whether the identified central pixel is a background pixel, and wherein the determining a value for the pixel in the interpolated video frame is based at least in part on a weighted average of the value of the pixels in the patch of pixels in the first video frame and the value of the pixels in the patch of pixels in the second video frame include:

identifying a second central pixel in the patch of pixels from the second video frame; and determining an intensity distance based at least in part on the identified central pixel and the identified second central pixel;

wherein the determining the value for the pixel in the interpolated video frame is further based at least in part on the determined intensity distance.

27. A system to upconvert the frame rate of a digital video comprising:

a processor; and a frame rate up-conversion (FRUC) tool communicatively coupled to the processor, the FRUC tool configured to:

insert an interpolated video frame between a first video frame and a second video frame of the video;

the FRUC tool including a background determination module configured to determine, for each pixel in the interpolated video frame, whether the pixel is a background pixel based at least in part on pixels in the first video frame and pixels in the second video frame;

the FRUC tool further including a filter module coupled to the determination module and configured to set, in response to determination that the pixel in the interpolated video frame is a background pixel, a value of the pixel in the interpolated video frame based at least in part on a value of a corresponding pixel in the first video frame and a value of a corresponding pixel in the second video frame; and the filter module is further configured to set, in response to determination that the pixel in the interpolated video frame is not a background pixel, the value of the pixel in the interpolated video frame based at least in part on application of a nonlocal means filter to the first video frame and the second video frame, wherein to set, in response to determination that the pixel in the interpolated video frame is not a background pixel, the value of the pixel in the interpolated video frame based at least in part on application of the nonlocal means filter to the first video frame and the second video frame, the filter module is further configured to:

identify a patch of pixels in the first video frame;

identify a patch of pixels in the second video frame, wherein the patch of pixels in the second video frame is temporally symmetric to the patch of pixels in the first video frame;

identify a central pixel in the patch of pixels from the first video frame;

determine whether the identified central pixel is a background pixel; and determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame.

28. The system of claim 27, wherein to determine a value for the pixel in the interpolated video frame, based on the determining whether the identified central pixel is a background pixel, wherein the determining a value for the pixel in the interpolated video frame is based at least in part on a weighted average of the value of the pixels in the patch of pixels in the first video frame and the value of the pixels in the patch of pixels in the second video frame, the filter module is further configured to:

identify a second central pixel in the patch of pixel from the second video frame; and determine an intensity distance based at least in part on the identified central pixel and the identified second central pixel;

wherein the determining a value for the pixel in the interpolated video frame is further based at least in part on the determined intensity distance.

* * * * *

UNITED STATES PATENT AND TRADEMARK OFFICE
CERTIFICATE OF CORRECTION

PATENT NO. : 9,294,711 B2  
APPLICATION NO. : 14/122229  
DATED : March 22, 2016  
INVENTOR(S) : Shirani et al.

Page 1 of 1

It is certified that error appears in the above-identified patent and that said Letters Patent is hereby corrected as shown below:

In the specification

Column 1, Line 9, delete "§371" and insert -- § 371 --, therefor.

Column 1, Line 11, delete "§119(e)" and insert -- § 119(e) --, therefor.

Column 4, Line 37, delete "LCDs." and insert -- LCDs, --, therefor.

Column 7, Line 48, delete "(e.g." and insert -- (e.g., --, therefor.

Column 8, Line 25, delete "(e.g." and insert -- (e.g., --, therefor.

Signed and Sealed this
Twenty-eighth Day of June, 2016

Michelle K. Lee
*Director of the United States Patent and Trademark Office*